(12) United States Patent
Cassidy

(10) Patent No.: US 8,262,338 B2
(45) Date of Patent: Sep. 11, 2012

(54) VERTICAL AXIS DUAL VORTEX DOWNWIND INWARD FLOW IMPULSE WIND TURBINE

(76) Inventor: Joe C. Cassidy, The Dalles, OR (US)

(*) Notice: Subject to any disclaimer, the term of this patent is extended or adjusted under 35 U.S.C. 154(b) by 822 days.

(21) Appl. No.: 12/284,970

(22) Filed: Sep. 25, 2008

(65) Prior Publication Data

US 2009/0087300 A1    Apr. 2, 2009

Related U.S. Application Data

(63) Continuation-in-part of application No. 12/214,273, filed on Jun. 16, 2008, now abandoned, which is a continuation-in-part of application No. 11/652,429, filed on Jan. 11, 2007, now abandoned.

(51) Int. Cl.
*F03D 1/04* (2006.01)
(52) U.S. Cl. .......... 415/4.3; 415/55.1; 415/224
(58) Field of Classification Search ........... 415/1, 2.1, 415/4.1–4.5, 55.1, 224
See application file for complete search history.

(56) References Cited

U.S. PATENT DOCUMENTS

| | | | |
|---|---|---|---|
| 4,084,918 A * | 4/1978 | Pavlecka | 415/1 |
| 4,834,610 A * | 5/1989 | Bond, III | 415/53.3 |
| 7,230,348 B2 * | 6/2007 | Poole | 290/55 |
| 2004/0100103 A1 * | 5/2004 | Becherucci et al. | 290/55 |

OTHER PUBLICATIONS http://en.wikipedia.org/wiki/Pelton_wheel; Wikipedia, *Pelton Wheel*, pp. 1-5, printed May 1, 2009.
http://en.wikipedia.org/wiki/Francis_turbine, Wikipedia, *Francis turbine*, pp. 1-3, printed May 31, 2009.

* cited by examiner

*Primary Examiner* — Ross Gushi
(74) *Attorney, Agent, or Firm* — Chernoff Vilhauer McClung & Stenzel, LLP

(57) ABSTRACT

A wind-powered turbine has a housing with an inlet and an outlet. Located in the housing is a cylindrical stator array having a plurality of spaced-apart stators located in it. An annular cylindrical rotor array having a plurality of cups rotates about a central axis, fits inside of the stator array. The stators are positioned to cause air which flows around the outer periphery of the stator array to impinge on the rotors and an air handling system causes air entering the housing to be distributed substantially around the periphery of the stator array.

11 Claims, 8 Drawing Sheets

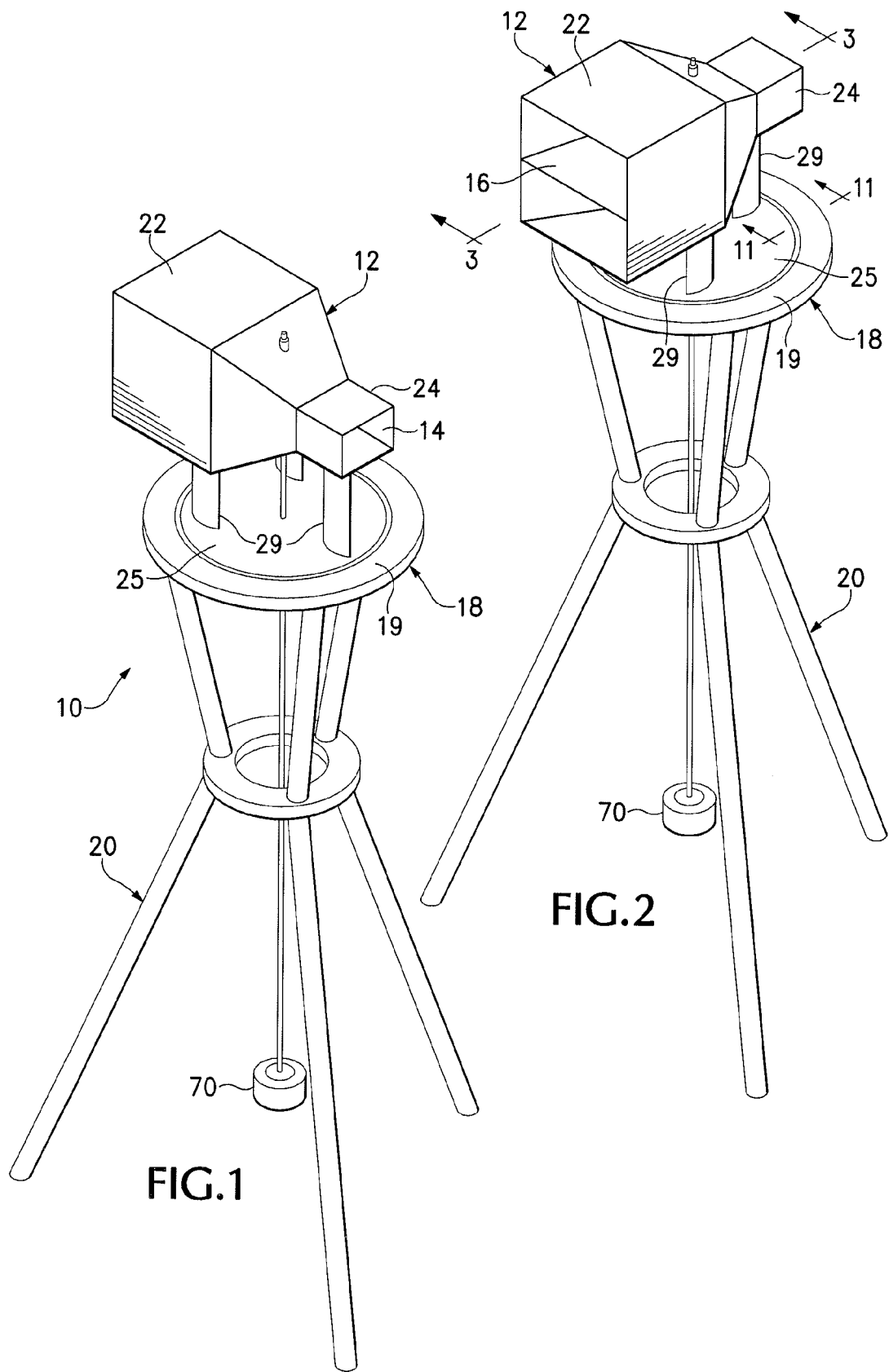

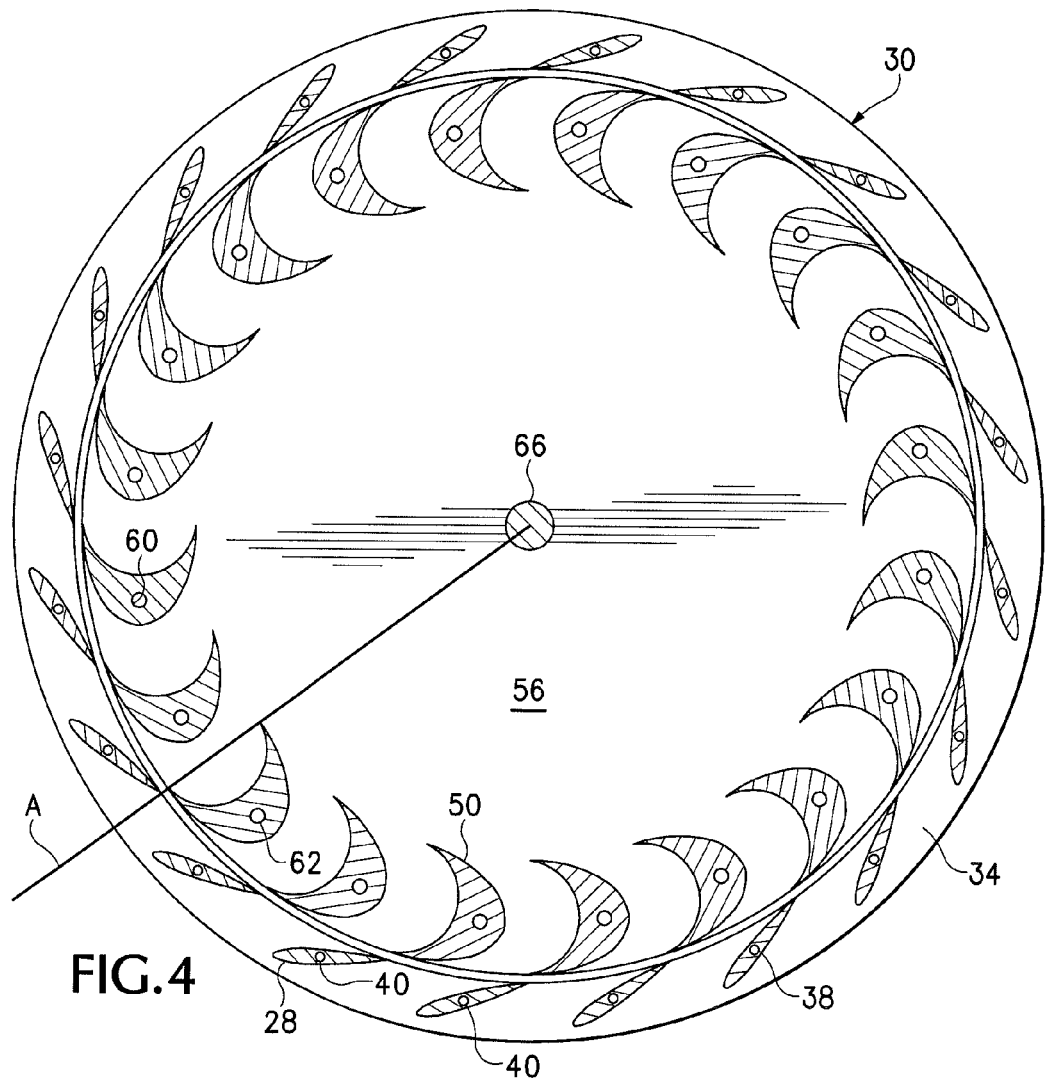
FIG.4
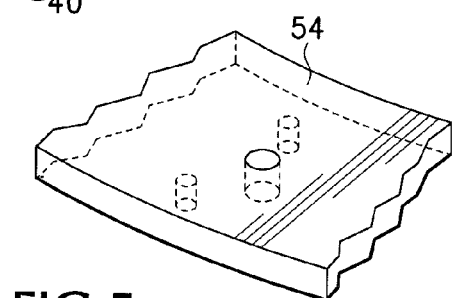
FIG.5
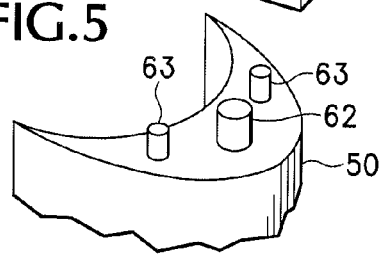

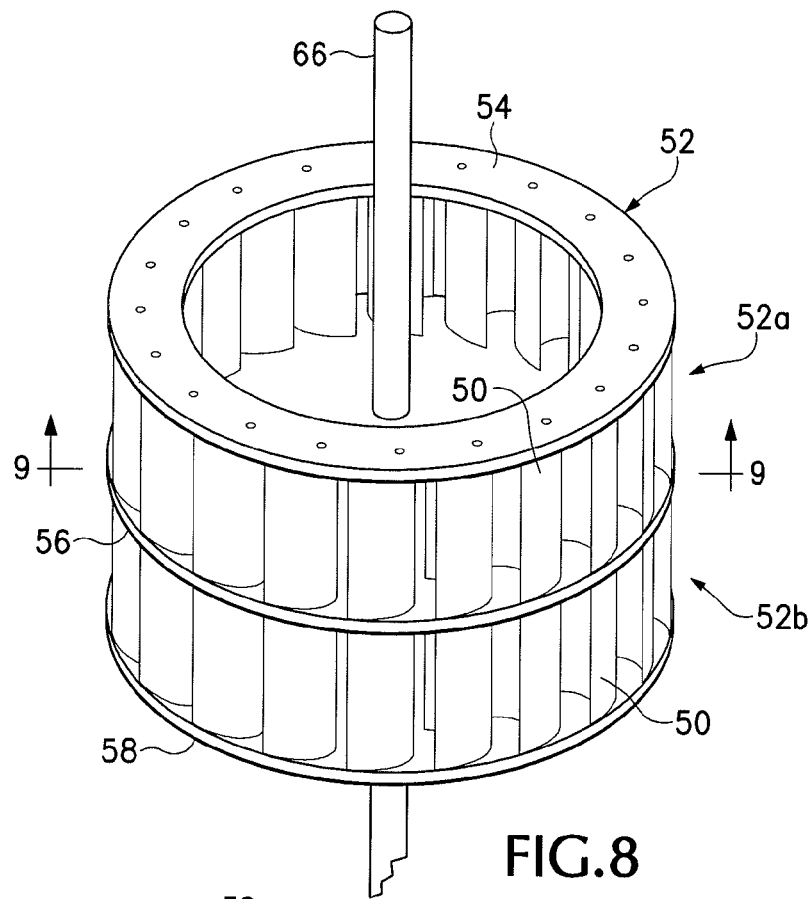
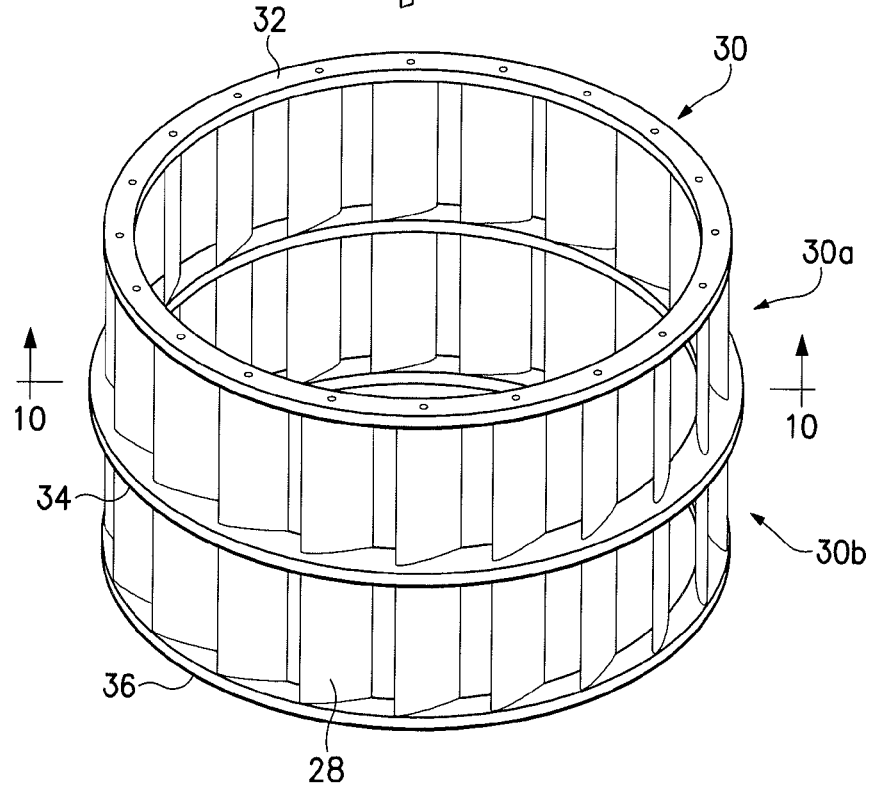
FIG.8

VERTICAL AXIS DUAL VORTEX DOWNWIND INWARD FLOW IMPULSE WIND TURBINE

RELATED APPLICATIONS

This application is a Continuation-In-Part of application Ser. No. 12/214,273, Filed Jun. 16, 2008 now abandoned which in turn is a Continuation-In-Part of application Ser. No. 11/652,429, Filed Jan. 11, 2007 now abandoned

BACKGROUND OF THE INVENTION

The subject invention relates to wind-powered turbines. Wind has been used as a source of power for many years. Windmills historically have been used to grind grain, pump water and provide other forms of mechanical energy. In recent times they have been used to generate electric power. However, windmills typically utilize a blade or air foil which the wind passes over without significantly changing directions.

Water-powered turbines, on the other hand, are often impulse turbines where the direction of the water is significantly changed as it interacts with the turbine blade. A typical example of this is the pelton turbine. However, impulse turbines have not been used to convert wind energy to electric power.

BRIEF SUMMARY OF THE INVENTION

In the subject invention, a wind-powered turbine has a housing with an inlet and an outlet. Mounted in the housing is a plurality of spaced-apart stators that are arranged in a fixed annular cylindrical stator array. A plurality of cupped rotors are arranged in an annular cylindrical rotor array which is rotatable about a central axis and fits inside of the stator array. The stators are positioned to cause air which flows around the outer periphery of the stator array to impinge on the rotors. An air handling system causes air entering the housing to flow around the outer periphery of the stator array.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 1 is a perspective view of a wind turbine embodying the subject invention.

FIG. 2 is a perspective view of the wind turbine of FIG. 1 with the housing in a different orientation.

FIG. 4 is a cross-sectional view, at an enlarged scale, taken along the lines 4-4 in FIG. 3.

FIG. 5 is an exploded fragmentary view showing how a rotor is attached to a rotor ring.

FIG. 8 is an exploded view showing portions of the turbine.

DETAILED DESCRIPTION OF PREFERRED EMBODIMENT

Figure 11:
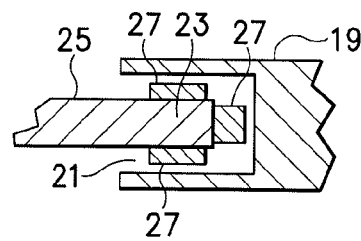
FIG. 11 is a cross-sectional view taken on the line 11-11 in FIG. 2.

Referring now to FIGS. 1 and 2, a wind-powered turbine 10 comprises a housing 12 with an inlet end 24 containing an inlet 14 and an outlet end 22 containing an outlet 16. In the embodiment illustrated in FIGS. 1-3, the entire inlet end 12a is open to provide the inlet 14, and the entire outlet end 12b is open to provide the outlet 16. The housing 12 is mounted on a turntable 18 which in turn is mounted on top of a tower 20. Referring now also to FIG. 11, the turntable 18 has an outer ring 19 which is attached to the tower 20. The outer ring 20 has a slot 21 formed in its inner periphery. The outer periphery 23 of a cylindrical plate 25 extends into the slot 21. Roller bearings 27 are located between the top, bottom and edge of the plate 25 and the ring 19. Thus, the plate 25 rotates freely and supports the housing against vertical and radial loads. The housing 12 is attached to the plate through struts 29. The struts support the housing 10 sufficiently above the turntable 18 that the turntable has no effect on wind entering the housing. In the embodiment illustrated the struts separate the housing from the turntable by an amount equal to 50% of the height of the inlet 14. The turntable allows complete rotation of the housing 12 so that the inlet can face into the wind. The housing 12 has a larger cross-sectional shape at its outlet end 22 than at its inlet end 24. This causes wind-driven air passing over the housing to accelerate as it moves from the inlet end 24 to the outlet end 22, thereby causing the pressure at the housing outlet 16 to be lower than the pressure at the housing inlet 14. The advantage of this will be more fully explained later. In the embodiment illustrated, the housing is square in cross-section but it could have many other cross-sectional shapes. Preferably the entire housing is symmetrical so that the distance from the inlet end to the outlet end is equal around its entire extent.

Figure 3:
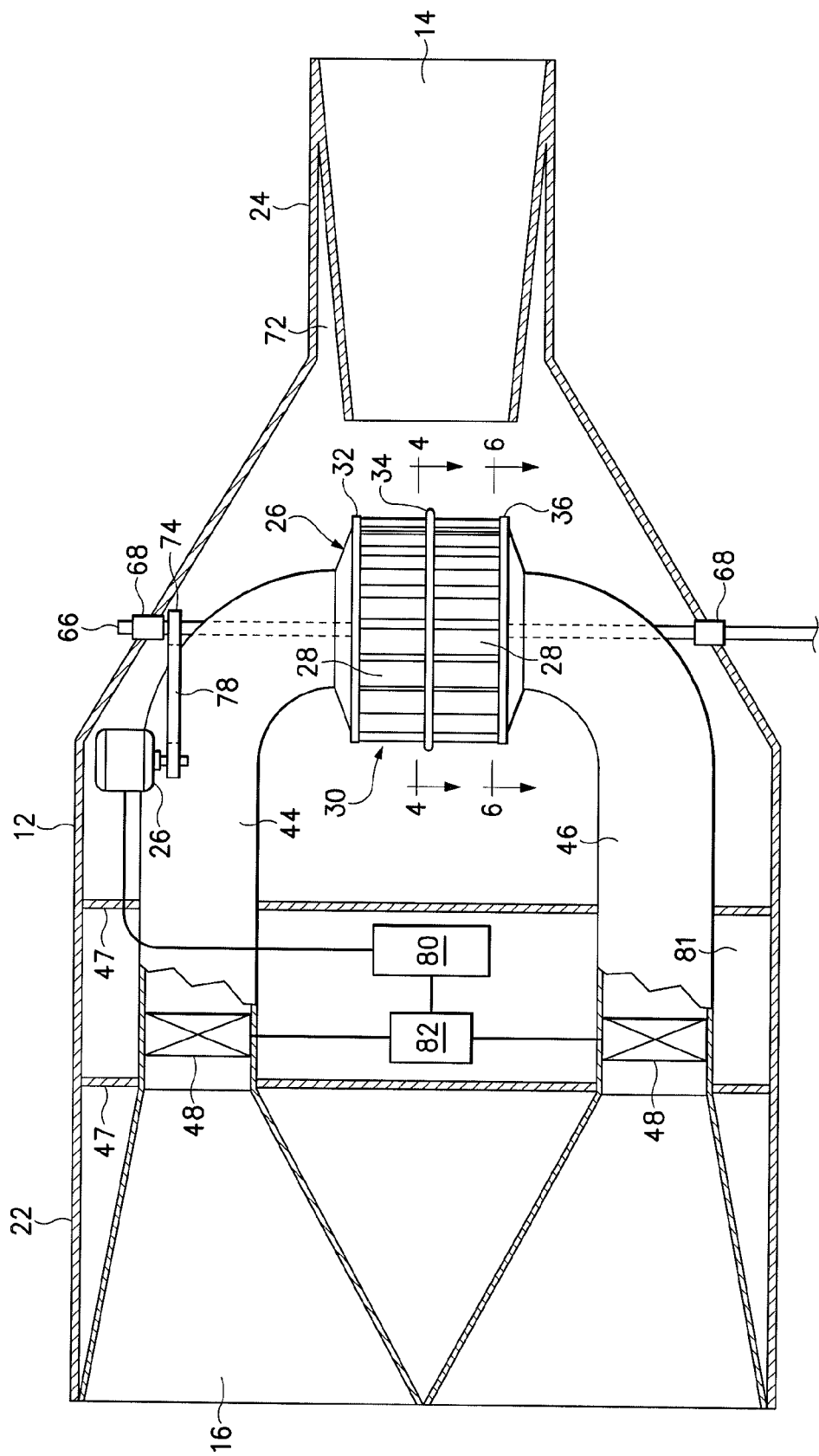
FIG. 3 is a cross-sectional view, at an enlarged scale, taken along the lines 3-3 in FIG. 2.
Figure 6:
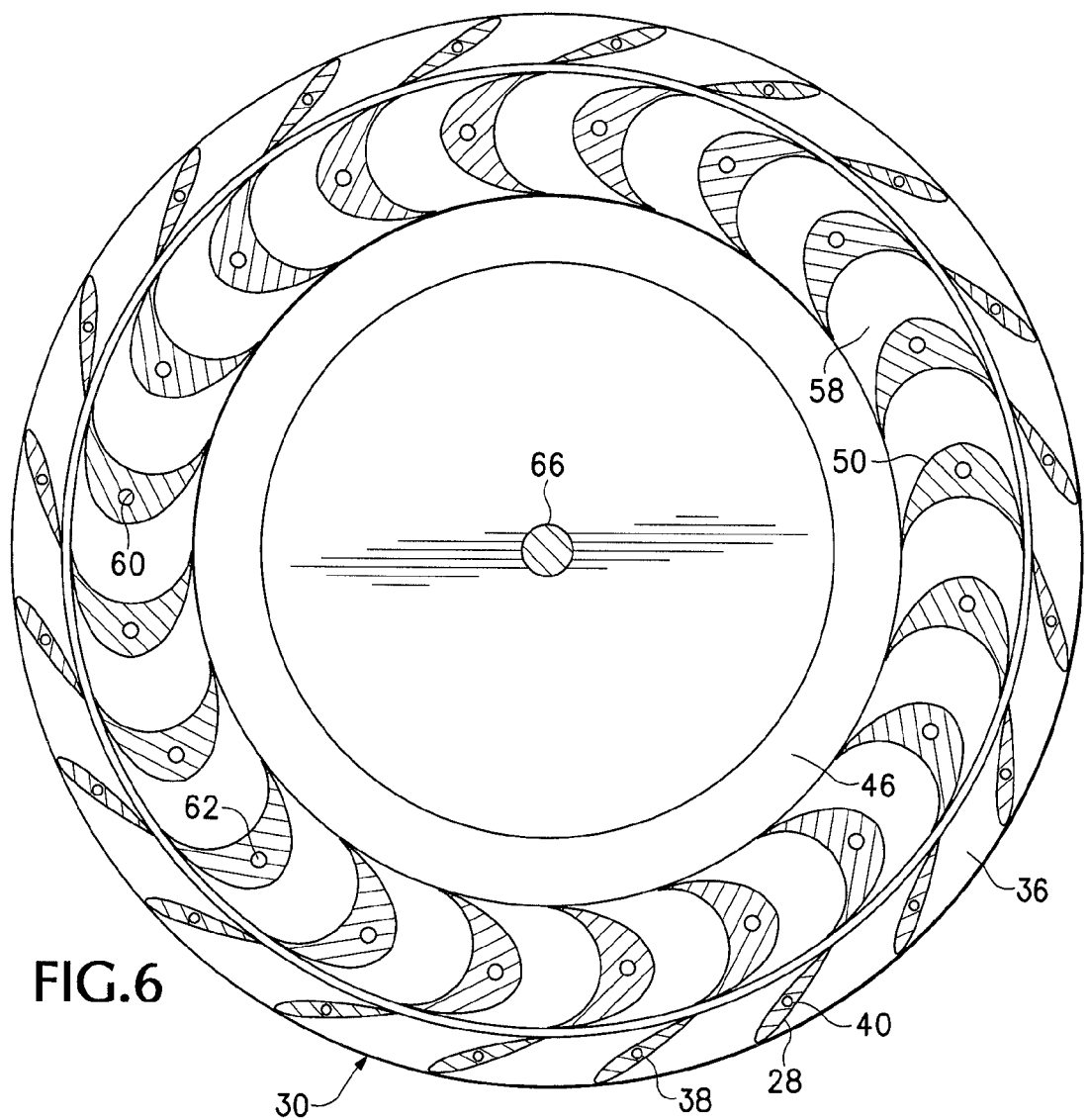
FIG. 6 is a cross-sectional view, at an enlarged scale, taken along the lines 6-6 in FIG. 3.
Figure 7:
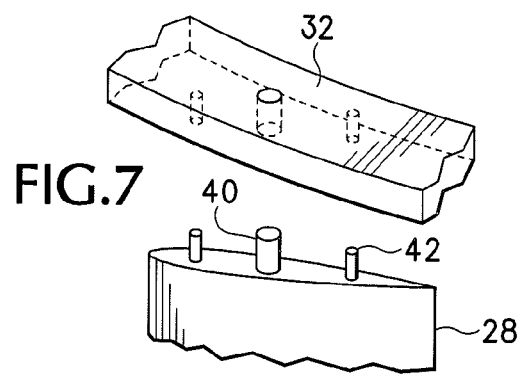
FIG. 7 is an exploded fragmentary view showing how a stator is attached to a stator ring.
Figure 9:
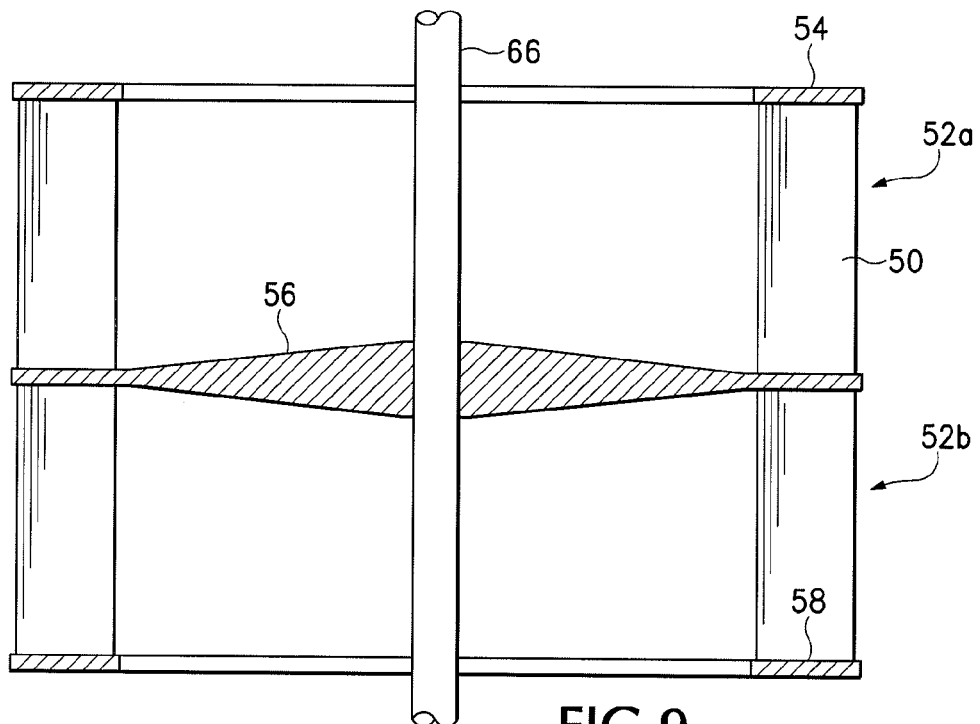
FIG. 9 is a cross-sectional view taken on the line 9-9 in FIG. 8.
Figure 10:
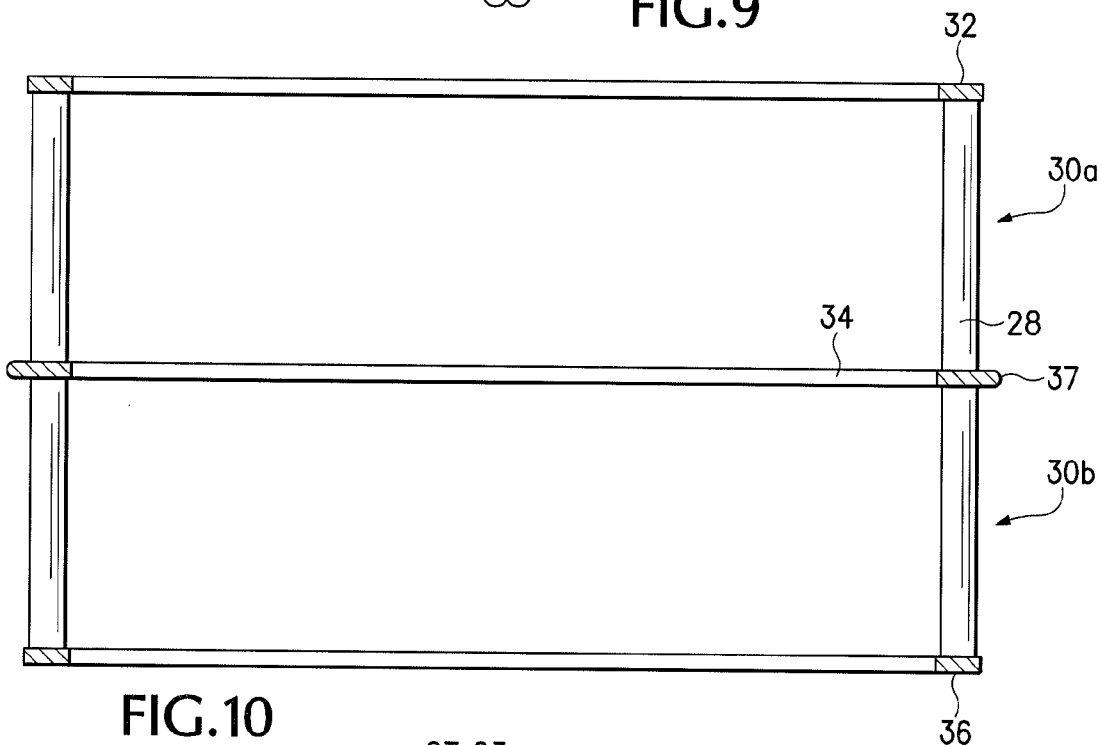
FIG. 10 is a cross-sectional view taken on the line 10-10 in FIG. 8.

Referring now to FIG. 3, a cylindrical turbine assembly 26 is mounted in the housing between the inlet end and the outlet end. The turbine assembly 26, best seen in FIGS. 4, 6 and 8 includes a plurality of stators 28 which are arranged in an annular cylindrical stator array 30. The stator array is divided into a first section 30a and a second section 30b which are separated from one another. The first stator section is located between an annular upper stator ring 32 and an annular middle stator ring 34 and the second stator section is located between the middle stator ring 34 and an annular lower stator ring 36. The outer periphery of the middle stator ring contains a rounded bull nose 37 which projects outwardly from the stators to assist in splitting air entering the turbine assembly 26 between the first and second Sections 30a, 30b. Each stator 28 has a hole 38 extending centrally through it, and a rod 40, which passes through the hole 38, is attached to the upper, middle and lower stator rings. Thus, the rod joins the stators and stator rings into an integral unit. The stators are tear-drop shaped and are symmetrical side to side. They are angled to direct air entering the turbine in the desired manner, as will be explained later. Pins 42 extend between the tops and bottoms of the stators into the stator rings to prevent the stators from rotating on the rods 40, FIG. 7. The number of stators, and thus the spacing between them, is set to cause the air entering the turbine assembly 26 to be distributed relatively equally around the entire outer periphery of the stator array 30.

Referring back to FIG. 3, the upper stator ring 32 is attached to a tubular upper draft tube 44 which bends 90 degrees and extends towards the outlet end 22 of the housing 12. The bracket which attaches the upper stator ring to the upper draft tube is not shown. The end of the upper draft tube 44 flairs outwardly to cover approximately one-half of the outlet 16. This causes air flowing through the draft tube to slow down as it approaches the outlet 16. The lower stator ring 36 is attached to a tubular lower draft tube 46 which also bends 90 degrees and extends towards the outlet end 22 of the housing 12. The lower draft tube also flares outwardly to cover the remaining half of the exit 16. Valves, shown schematically at 48, are located in both draft tubes to allow them to be selectively opened and closed, as will be explained later. The draft tubes are attached to the housing through a pair of isolation walls 47 and are what hold the stator array 30 in place. The isolation walls also force all the air entering the inlet 14 to pass through the turbine assembly and out of the draft tubes 44, 46.

The turbine assembly 26 also includes a plurality of cupped rotors 50 which are arranged in an annular rotor array 52 which fits immediately inside of the stator array 30. The rotor array also is divided into a first section 52a and a second section 52b, which are separated from one another. The cupped shape of the rotors causes air striking them to change direction much as the rotors do in an pelton hydraulic turbine. In the embodiment illustrated, the air exits the rotors at approximately 164 degrees relative to where it enters them, but increasing or decreasing this angle may increase the efficiency of the turbine. In the embodiment illustrated the rotors are oriented such that a line A which connects their tips extends through the center of the rotor array, FIG. 4.

The first rotor section 52a is located between an annular upper rotor ring 54 and a cylindrical cross-sectioned rotor plate 56, and the second rotor section 52b is located between the rotor plate 56 and an annular lower rotor ring 58. In the embodiment illustrated, the rotor plate is wider proximate its center than at its periphery to assist in dividing air between the first and second sections 52a, 52b. Each rotor 50 has a hole 60 extending centrally through it, and a rod 62, which passes through the hole 60, is attached to the upper and lower rotor rings and the rotor plate. Thus, the rod joins the rotors, rotor rings and rotor plate into an integral unit. Pins 63 extend between the tops and bottoms of the rotors into the rotor rings and rotor plate to prevent the rotors from rotating on the rods 62, FIG. 5. In the embodiment illustrated there are the same number of rotors as there are stators. An axle 66, which is attached to the center plate 56, extends downwardly out of the housing to a driven device such as a generator, compressor, flywheel, etc. (not shown). The axle 66 is journaled in stabilizer bearings 68 which are mounted in the housing 12. A thrust bearing 70 located on the ground at the bottom of the axle supports it. A pulley 74 located on the axle 66 is connected through a belt 78 to a small alternator 76, which is mounted on the housing. The alternator keeps a battery 80 located in an isolation space 81 between the isolation walls 47 charged. The battery powers a small computer 82 which monitors environmental conditions and shuts the turbine down when conditions, such as high wind or ice, dictate.

A rectangular nozzle 72 located in the inlet end 22 of the housing directs wind-driven air entering the housing onto the turbine assembly 26.

The turbine is initially started with the valves 48 in the draft tubes 44, 46 closed so that no air enters the housing 12 through the inlet 14. As mentioned above, because of the shape of the housing air flowing over it causes the pressure at its outlet 16 to be lower than the pressure at its inlet 14, and also below ambient pressure. When the valves 48 are opened this negative pressure pulls air through the draft tubes. This causes the air to spiral up and out of the first section 52a of the rotor array and into the first section 30a of the stator array, and down and out of the second section 52b of the rotor array and into the second section 30b of the stator array. It also causes air to be pulled into the inlet at a velocity above the ambient wind velocity. Providing the proper number of stators limits the amount of air that can pass between each adjacent pair of stators. This limitation and the alignment of the stators causes the air to enter the stator array 30 around substantially its entire peripheral extent. One function of the draft tubes is to convert into useable power the energy tied up in its high velocity as it leaves the rotors. This is done by gradually reducing the high air velocity at the inlet end of the draft tubes to a lower velocity at the discharge end of the draft tubes. The turbine is shut down by gradually closing the valves 48 in the draft tubes.

When the velocity of the wind entering the housing 12 reaches a certain level, the turbine and/or a device driven by it would rotate at a rate that is above their design limits. When this occurs one of the valves 48 can be closed and air will only enter the turbine through one of the draft tubes 44, 46. Thus the air will impact only one of the turbine sections. This will cause the turbine to operate at a lower speed than it would if air were admitted to both turbine sections and the turbine will provide roughly one-half of the energy. While the same result could be obtained by partially closing both valves 48, placing a partial restriction in the draft tubes would result in an unacceptable level of noise being generated.

The large cross-section area at the housing outlet 16 causes the turntable 18 to rotate such that the inlet 14 always faces into the wind. If the rotational force caused by the turbine assembly 26 causes misalignment of the housing relative to the direction of the wind, there are several ways of compensating for this. Due to the large cross-sectional area at the outlet end 22 of the housing 12, the housing will not pinwheel.

Figure 12:
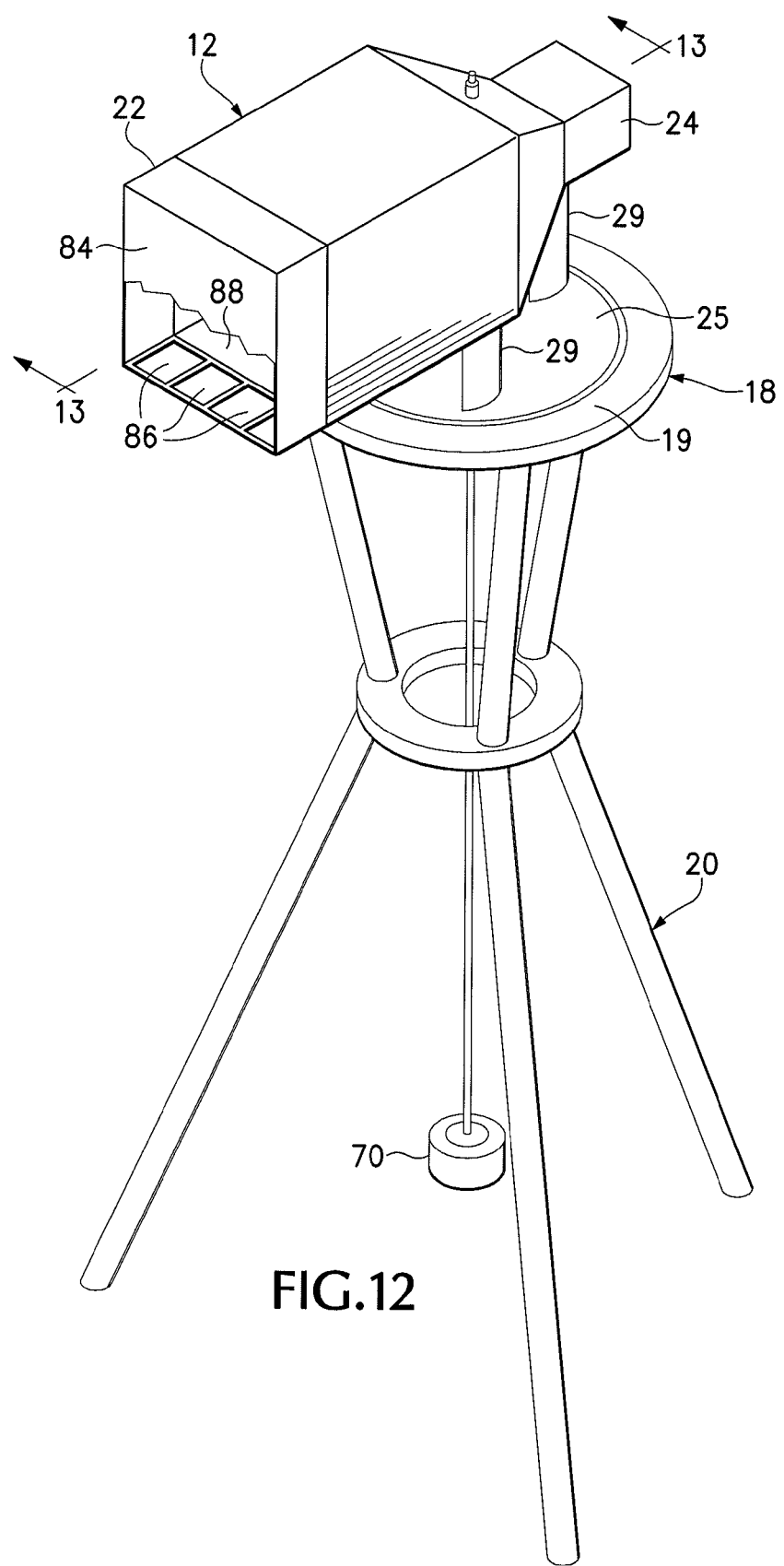
FIG. 12 is a perspective view, similar to FIG. 2 of an alternate embodiment of the invention.
Figure 13:
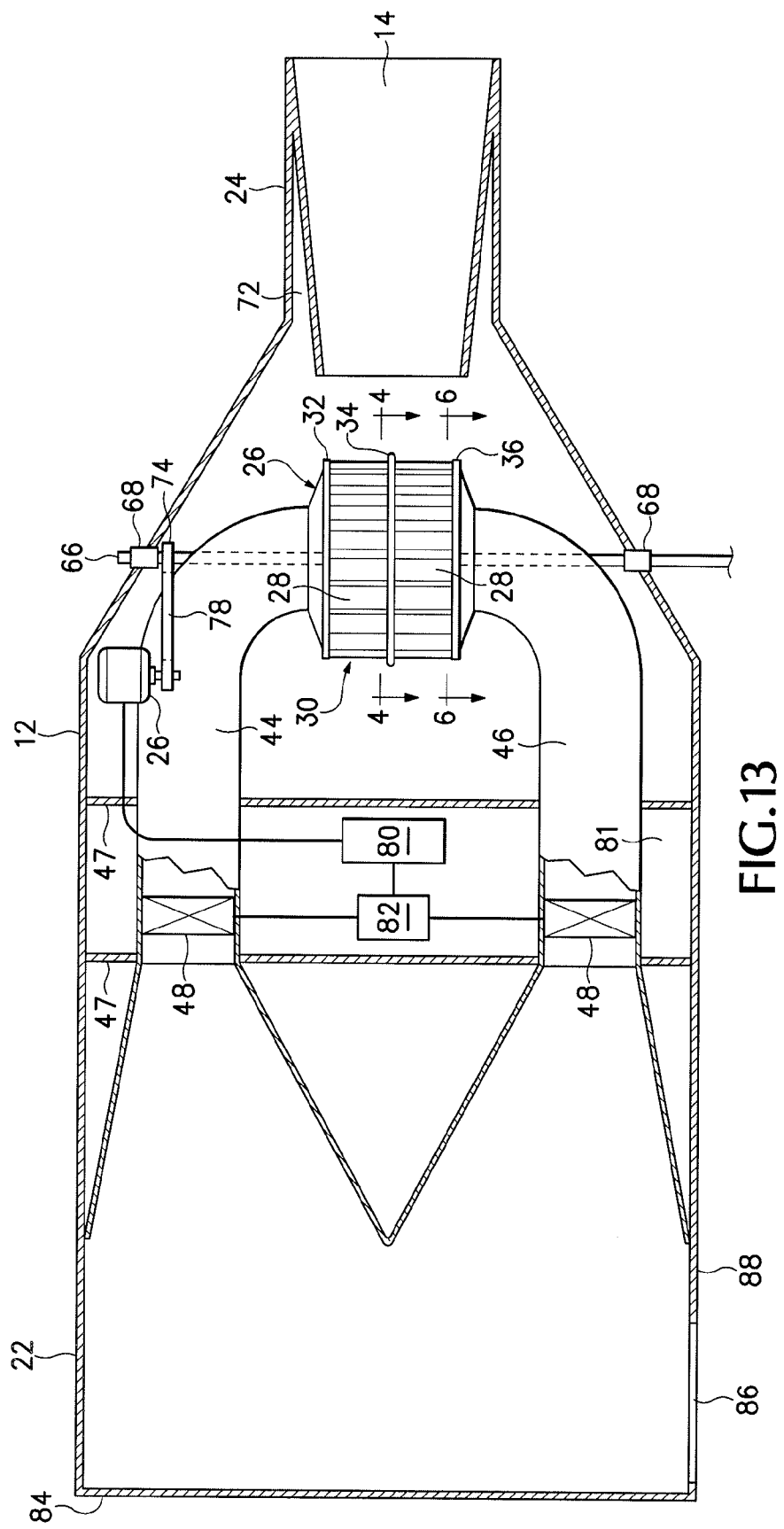
FIG. 13 is a cross-sectional view, at an enlarged scale, taken along the lines 13-13 in FIG. 12.

In another embodiment of the invention, shown in FIGS. 12 and 13, the outlet end 22 of the housing 12 extends rearwardly a short distance past where the upper and lower draft tubes 44, 46 come together. In this embodiment the outlet end 22 of the housing 12 is closed with an end plate 84, and the outlet is a series of slots 86 located in the lower wall 88 of the housing 12. The total cross sectional area of the slots 86 needs to be at least as equal as the total cross sectional area of the inlet 14, and preferably is considerably larger. This configuration provides a greater pressure differential between the inlet and outlet than the embodiment illustrated in FIGS. 1-3. As a result, the air enters the stator array 30 more uniformly around its periphery, which creates a higher turbine efficiency.

The terms and expressions which have been employed in the foregoing, specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A wind powered turbine comprising:
   (a) a housing having an inlet and an outlet;
   (b) a plurality of spaced apart stators arranged in a fixed annular cylindrical stator array;
   (c) a plurality of cupped rotors arranged in an annular cylindrical rotor array which is rotatable about a central axis and fits within said stator array;

(d) said stators being positioned to cause air which flows around an outer periphery of said stator to impinge on said cup rotors;

(e) an air handling system which causes air entering said housing to flow around substantially the entire outer periphery of said stator array;

(f) wherein said stator and rotor arrays are divided into a first section and a second section which are separated from one another, and a first portion of the air entering said housing flows through said first section and a second portion of the air entering said housing flows through said second section.

2. The turbine of claim 1 wherein said first and second sections of said rotor array are joined and rotate together.

3. The turbine of claim 2 wherein said air handling system comprises a tubular draft tube which directs air radially out of the center of said rotor array toward the outlet of said turbine housing.

4. The turbine of claim 3 including an isolation wall located in said housing to cause all of the air entering said inlet to flow through said stator and rotor arrays and through said draft tube.

5. The turbine of claim 3 wherein said draft tube is sized such that the velocity of air becomes lower as it passes therethrough.

6. The turbine of claim 3 wherein a valve is located in said draft tube to selectively stop the flow of air through said turbine.

7. The turbine of claim 1 wherein said air-handling system comprises a first draft tube which directs air radially out of the center of said first section of said rotor array, and a second draft tube which directs air radially out of the center of said second section of said rotor array.

8. The turbine of claim 1 wherein said stator array comprises:

(a) upper, middle and lower annular stator rings with the stators in said first section extending between the upper and middle stator rings and the stators in the second section extending between said middle and lower stator rings;

(b) said stators having holes extending longitudinally therethrough; and (c) a plurality of rods, one associated with each stator which passes through the hole in said stator and is attached to said upper, middle and lower rings.

9. The turbine of claim 1 wherein said rotor array comprises:

(a) upper and lower annular rotor rings and a circular cross-sectioned rotor plate which is located between said upper and lower rotor rings, the rotors in said first section extending between said upper rotor ring and said rotor plate and the rotors in said second section extending between said lower rotor ring and said rotor plate;

(b) said rotors having holes extending longitudinally therethrough; and (c) a plurality of rods, one associated with each rotor which passes through the hole in said rotor and is attached to said upper and lower rotor rings and said rotor plate.

10. The turbine of claim 9 including an axle which extends centrally through said rotor array and is attached to said rotor plate.

11. A method of operating a wind-powered turbine having a housing with an inlet and an outlet, a plurality of spaced-apart stators arranged in a fixed annular cylindrical stator array, a plurality of cupped rotors arranged in an annular cylindrical rotor array which is rotatable about a central axis and fits within said stator array, said stators being positioned to cause air which flows around an outer periphery of said stator array to impinge on said cupped rotors, and an air handling system which causes air entering said housing to flow around substantially the entire outer periphery of said stator array, said stator and rotor arrays being divided into a first section and a second section which are separated from one another, wherein a first portion of the air entering said housing flows through said first section and a second portion of the air entering said housing flows through said second section, including a first draft tube which directs air radially out of the center of said first section of said rotor array, and a second draft tube which directs air radially out of the center of said second section of said rotor array, said method comprising:

(a) placing an air control valve in both of said air valves; and (b) closing the air control valve in one of said draft tubes while leaving the other of the air control valves open, to prevent air from flowing through said one of said draft tubes when the wind velocity exceeds a certain level.

* * * * *